United States Patent
Walsh et al.

(10) Patent No.: US 11,465,437 B2
(45) Date of Patent: *Oct. 11, 2022

(54) SPEED SQUARE WITH EXTENSION

(71) Applicant: APEX BRANDS, INC., Apex, NC (US)

(72) Inventors: Brendan Michael Walsh, Holly Springs, NC (US); Timothy T. McKenzie, Westminster, MD (US)

(73) Assignee: Apex Brands, Inc., Apex, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/696,434

(22) Filed: Mar. 16, 2022

(65) Prior Publication Data
US 2022/0203753 A1 Jun. 30, 2022

Related U.S. Application Data

(63) Continuation of application No. 17/497,406, filed on Oct. 8, 2021, now Pat. No. 11,325,413, which is a continuation of application No. 17/407,544, filed on Aug. 20, 2021, which is a continuation of application No. 16/345,868, filed as application No. PCT/US2017/058060 on Oct. 24, 2017, now Pat. No. 11,161,366.

(Continued)

(51) Int. Cl.
*B43L 7/02* (2006.01)
*G01B 3/56* (2006.01)
*B43L 7/027* (2006.01)

(52) U.S. Cl.
CPC ............... *B43L 7/0275* (2013.01); *B43L 7/02* (2013.01); *G01B 3/566* (2013.01)

(58) Field of Classification Search
CPC .......... B43L 7/0275; B43L 7/02; G01B 3/566
See application file for complete search history.

(56) References Cited

U.S. PATENT DOCUMENTS 1,320,689 A 11/1919 Hart
3,908,281 A 9/1975 Fox
(Continued)

FOREIGN PATENT DOCUMENTS

CN 202879035 U 4/2013
CN 205156921 U 4/2016
(Continued)

OTHER PUBLICATIONS

Office Action from related CN application No. 201780081746.1 dated Sep. 2, 2020, all pages cited in its entirety.
(Continued)

*Primary Examiner* — Yaritza Guadalupe-McCall
(74) *Attorney, Agent, or Firm* — Burr & Forman LLP

(57) ABSTRACT

A speed square is provided including a triangular flat plate having measurement markings indicated on at least one face, a T bar affixed to, and extending along, the length of a first side of the triangular flat plate, and an extension element hingedly connected to an end of second side of the triangular flat plate opposite the T bar. The extension element having measurement markings indicated on at least one face, such that the measurement markings of the triangular flat face continue on the extension element.

20 Claims, 6 Drawing Sheets

Related U.S. Application Data

(60) Provisional application No. 62/496,889, filed on Oct. 31, 2016.

(56) References Cited

U.S. PATENT DOCUMENTS

| | | | |
|---|---|---|---|
| 5,832,618 | A | 11/1998 | Scarborough |
| 6,101,730 | A | 8/2000 | Marino |
| 7,114,264 | B1 * | 10/2006 | Hurley ................ B43L 7/0275 33/481 |
| 7,174,650 | B1 * | 2/2007 | Marshall ................ B43L 7/005 33/427 |
| 7,481,143 | B2 | 1/2009 | Hiland, Jr. |
| 8,074,368 | B2 | 12/2011 | Atwood |
| 8,146,260 | B1 * | 4/2012 | Visser ................... B43L 13/028 33/418 |
| D850,301 | S * | 6/2019 | Elysium ........................ D10/65 |
| 11,161,366 | B2 * | 11/2021 | Walsh .................. B43L 7/0275 |
| 2004/0172846 | A1 | 9/2004 | McRae |
| 2006/0085993 | A1 * | 4/2006 | Frankowiak ............ E04F 21/26 33/465 |
| 2009/0139104 | A1 | 6/2009 | Rohweder |
| 2010/0077625 | A1 * | 4/2010 | O'Morrow, Sr. ....... B43L 7/027 33/476 |
| 2010/0139106 | A1 * | 6/2010 | Atwood .................... B43L 7/12 33/418 |
| 2010/0000107 | A1 | 9/2010 | Cobb |
| 2012/0047758 | A1 | 6/2012 | Sander, Jr. et al. |
| 2016/0097624 | A1 | 4/2016 | Phillips |
| 2020/0047542 | A1 * | 2/2020 | Walsh ...................... B43L 7/02 |
| 2020/0307300 | A1 * | 10/2020 | Logan .................... G01B 3/566 |
| 2021/0379924 | A1 * | 12/2021 | Walsh ...................... B43L 7/02 |
| 2022/0024244 | A1 * | 1/2022 | Walsh .................. B43L 7/0275 |

FOREIGN PATENT DOCUMENTS

| | | |
|---|---|---|
| DE | 202008016391 U1 | 2/2009 |
| WO | 2008024121 A2 | 2/2008 |
| WO | 2018081099 A1 | 5/2018 |
| WO | WO-2018081099 A1 * | 5/2018 ................ B43L 7/02 |

OTHER PUBLICATIONS

International Search Report and Written Opinion from related international application No. PCT/US2017/058060 dated Jan. 15, 2018.

* cited by examiner

SPEED SQUARE WITH EXTENSION

CROSS REFERENCE TO RELATED APPLICATIONS

This application is a continuation of U.S. application Ser. No. 17/497,406, filed on Oct. 18, 2021 which is a continuation of U.S. application Ser. No. 17/407,544, filed on Aug. 20, 2021 which is a continuation of U.S. application Ser. No. 16/345,868, filed on Apr. 29, 2019, which is a national phase of international application number PCT/US2017/058060 filed on Oct. 24, 2017, which claims priority to U.S. application No. 62/496,889, filed on Oct. 31, 2016, the entire contents of which are hereby incorporated by reference.

TECHNICAL FIELD

Example embodiments generally relate to hand tools and, in particular, relate to a speed square with an extension.

BACKGROUND

Typical speed squares are used throughout construction industries. Speed squares usually include a metal plate in the shape of a right triangle with a T bar on one side of the plate. The plate is embossed or otherwise marked with one or more measurement markings, such as length, angles, and the like, such that a craftsman may set the square T bar at a position on a working material and use the measurement markings to quickly measure and mark angles, lines, or the like, The measurements and angle markings may be used for cutting the material in the desired shape and size.

Speed squares are manufactured in a variety of materials and sizes to accommodate the breadth of environments and uses in which speed squares are utilized. However, craftsman may have to switch between multiple speed squares, such as when working on different sized working materials, which may slow production or be tedious for the craftsman.

BRIEF SUMMARY OF SOME EXAMPLES

According to some example embodiments, a speed square is provided including a triangular flat plate having measurement markings indicated on at least one face, a T bar affixed to and extending along the length of a first side of the triangular flat plate, and an extension element hingedly connected to an end of a second side of the triangular flat plate opposite the T bar. The extension element including measurement markings indicated on at least one face, such that the measurement markings of the triangular flat face continue on the extension element.

BRIEF DESCRIPTION OF THE SEVERAL VIEWS OF THE DRAWING(S)

Having thus described the tool in general terms, reference will now be made to the accompanying drawings, which are not necessarily drawn to scale, and wherein:

DETAILED DESCRIPTION

Figure 1:
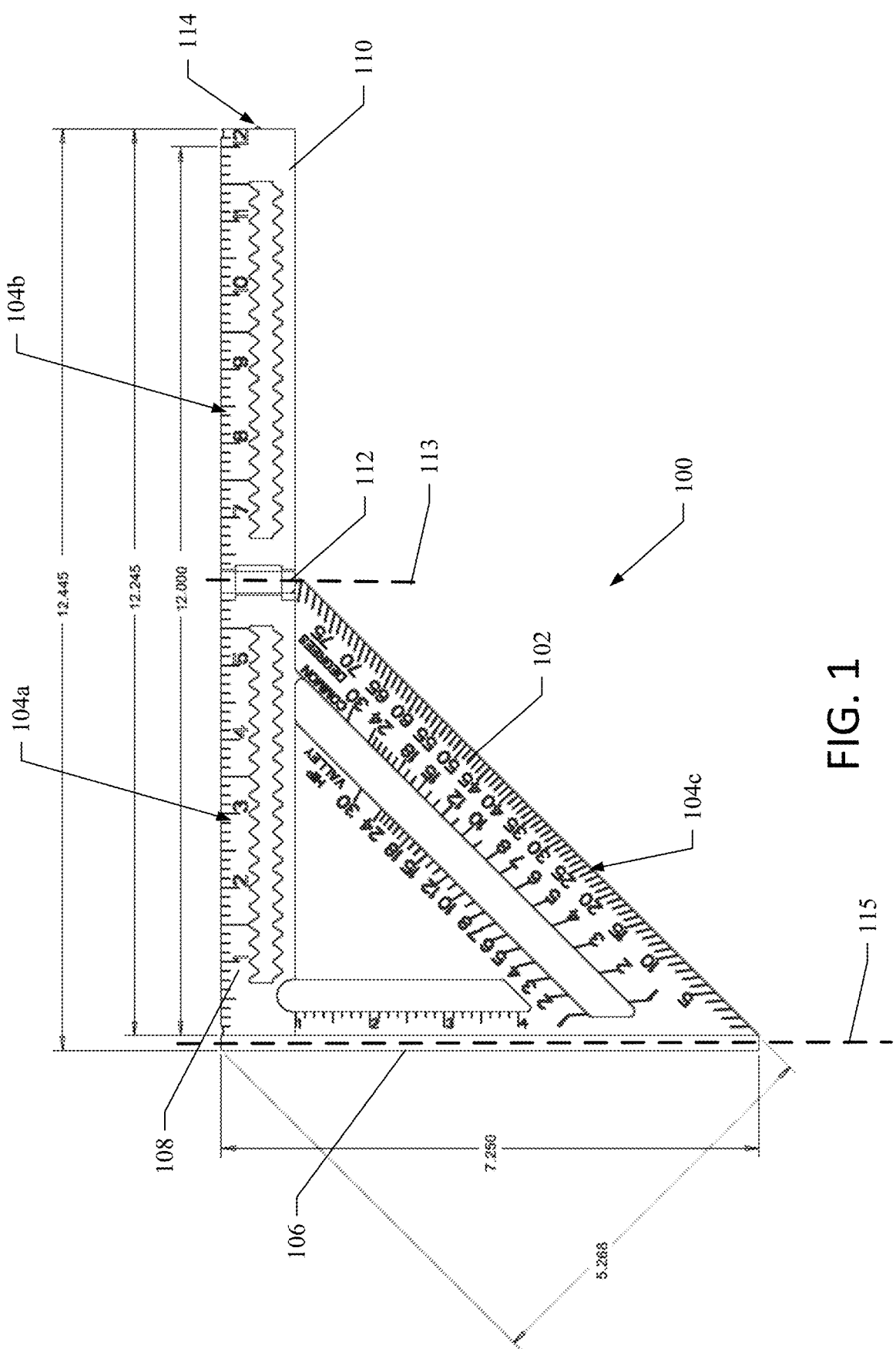
FIG. 1 illustrates a speed square with an extension element extended according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

A speed square is provided with a retractable extension element. The extension element may continue the measurement markings of the flat plate, such that, when extended, the extension element provides a continuous straight edge extending from the flat plate with an extension of the measurement markings. The speed square extension may be particularly useful in instances in which a craftsman is transitioning between smaller material and longer or thicker working material. The extension element may be retracted when working with the smaller working material and extended when working with the larger working material, such that measurements and markings may be made without switching speed squares, for example from a 7 inch speed square to a 12 inch speed square. Additionally, the extension element may be retracted for storage or when accessing a job site through a small access point.

Example Speed Square

An example embodiment of the speed square will now be described in reference to FIG. 1. FIG. 1 illustrates a speed square 100 with an extension element 110 extended according to an example embodiment. The speed square 100 may include a generally flat plate 102. The flat plate 102 may be formed in the shape of a right triangle. In some example embodiments, the flat plate 102 may be formed from aluminum, steel, plastic, or the like. In an example embodiment, the flat plate 102 may include measurement markings 104, such as length relative to a corner of the flat plate 102, angle marks relative to a corner of the flat plate 102, or the like. The measurement markings 104 may be printed, embossed, inscribed, or otherwise indicated on the flat plate 102.

The speed square 100 may also include a T bar 106. The T bar 106 may be affixed to and extend along the length of a first side of the flat plate 102. The T bar may extend past both faces of the flat plate 102, such that a portion of the T bar may extend over the edge of a working material when a face of the flat plate 102 is placed on the working material. The T bar 106 may be placed flush to straight surfaces of a working material for marking and measuring of the working material using the measurement markings 104 of the flat face 102.

The extension element 110 may be hingedly connected to an end of the second side 108 of the flat plate 102 opposite the T bar 106. In some example embodiments, the speed square 100 may include a hinge 112 connected on a first side to the flat plate 102 and on a second side to the extension element 110. Alternatively, the flat plate 102 and extension element 110 may include hinge elements, such as opposing C couplings and shafts, aperture and tabs or snap fittings, apertures with a hinge pin, or the like. In an example embodiment, the a rotational axis 113 of the hinge 112 may be parallel with a direction of extension 115 of the T bar 106.

The measurement markings 104 may include a first set of measurement markings 104a on the second side 108 of the flat plate 102, such as a length or 0-6 inches. In an example embodiment, the measurement markings 104 may include a second set or measurement markings 104b on the extension element 110, such as a length of 6-12 inches, which continue from the first set of measurement markings 104a. In some example embodiments, the measurement markings 104 may include a third set of measurement markings, such as angle marks on the hypotenuse side of the flat plate 102.

The extension element 110 may be configured to extend and retract between a stowed position and an open position. In the stowed position, the extension element 110 may lie on the flat plate 102. In the open position the extension element 110 may extend out from the second side 108 of the flat plate 106 and in the same plane as the flat plate 102. In the open position, the second side 108 of the flat plate 102 may form a continuous straight edge. Additionally, the measurement markings 104 may be continuous across the second side 108 of the flat plate 102 and the extension element 110.

The speed square 100 may include a retention element 114 configured to retain the extension element 110 in a stowed position. The retention element 114 is discussed in further detail below in reference to FIG. 4.

Figure 2:
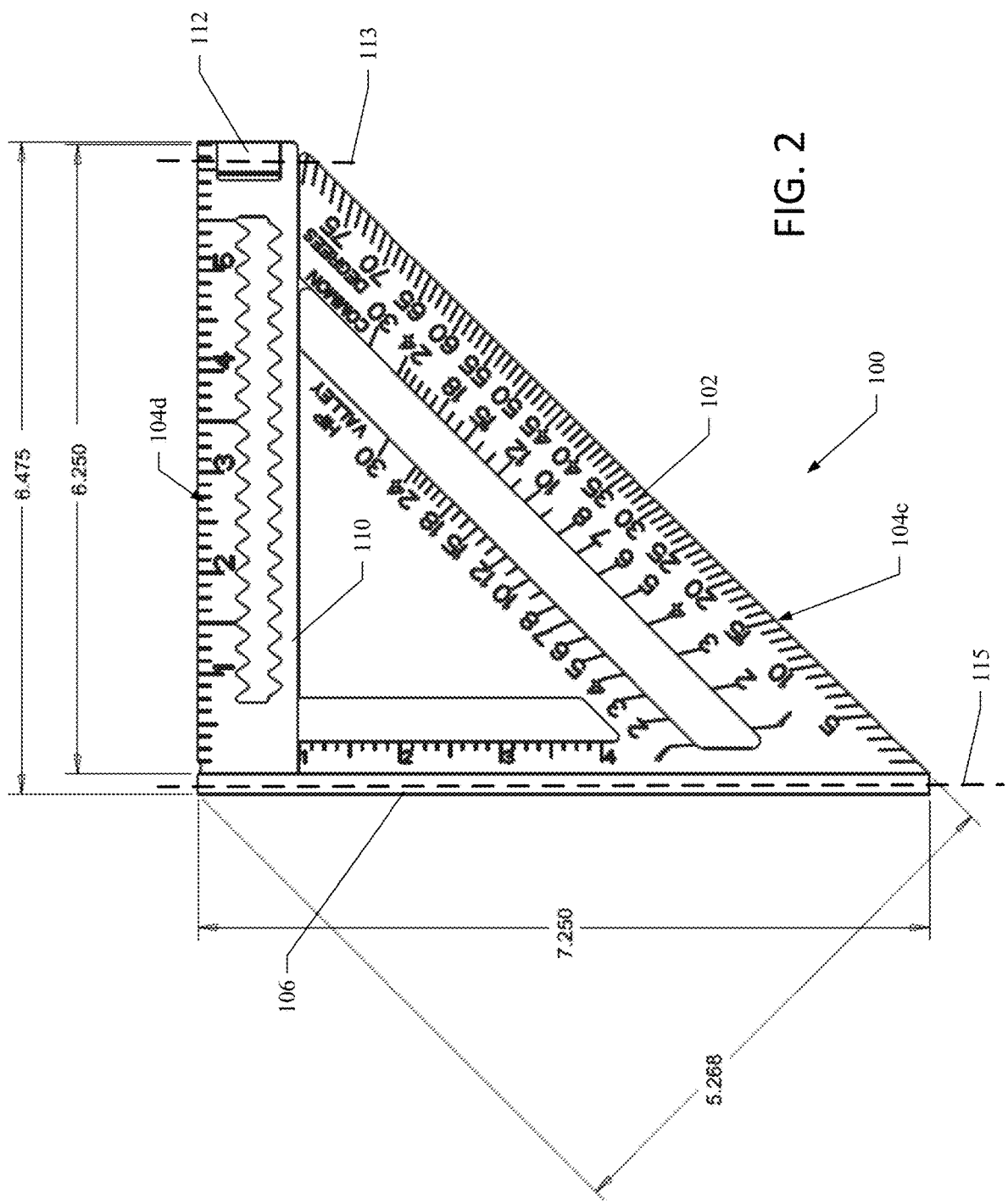
FIG. 2 illustrates a speed square with an extension element retracted according to an example embodiment.

FIG. 2 illustrates the speed square 100 with the extension element 110 retracted according to an example embodiment. In the stowed position, depicted in FIG. 2, the extension element 110 may lie on the flat plate 102. The measuring edges of the extension element 110 and the second side 108 of the flat plate 102 may be flush when the extension element 110 is in the stowed position. The extension element 110 may include a fourth set of measurement markings 104d. The fourth set of measurement markings 104d may be configured such that they reproduce the measurement markings 104a on the flat plate 102 which are obscured when the extension element 110 is in the stowed position.

Figure 3:
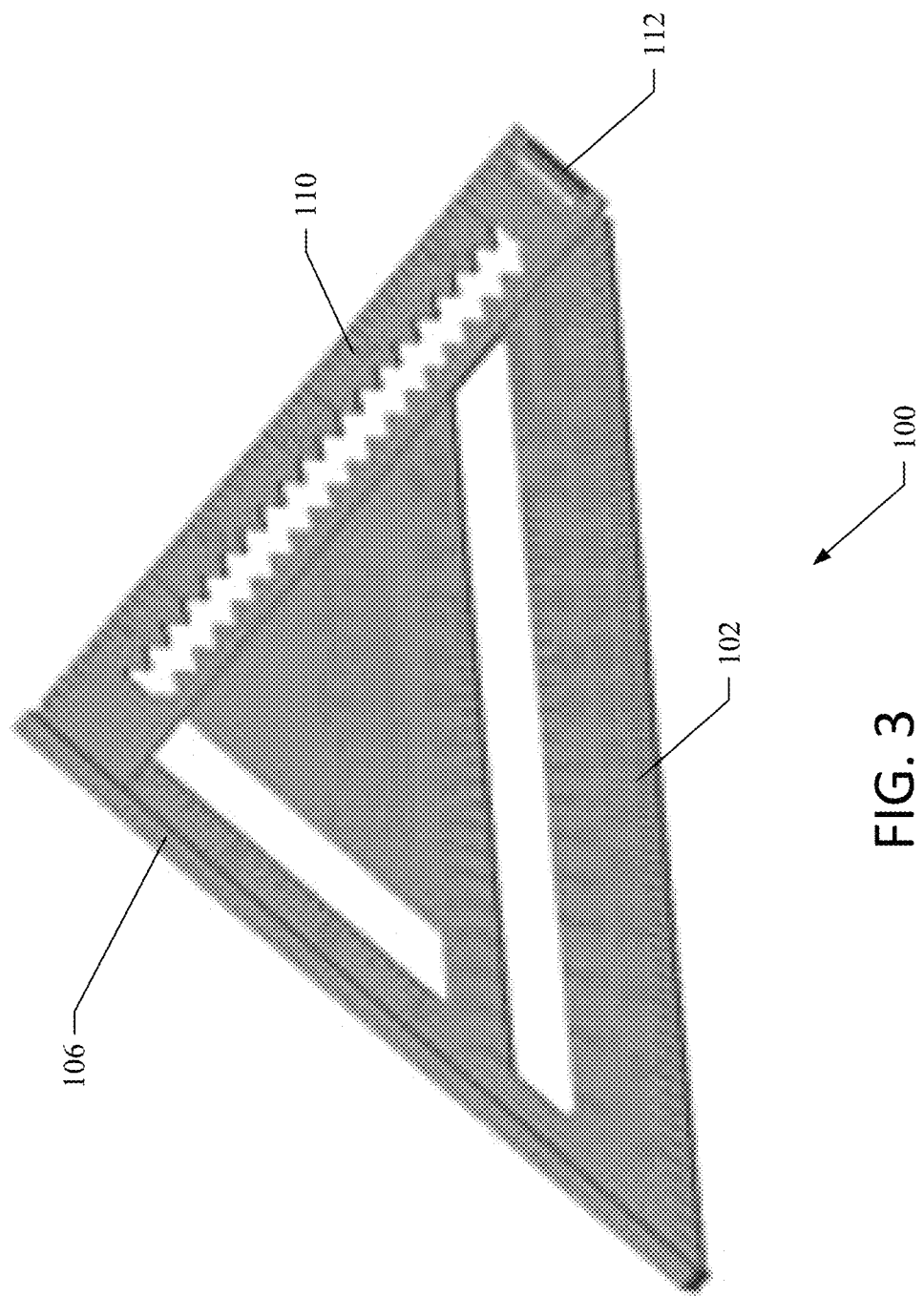
FIG. 3 illustrates a perspective view of a speed square with an extension element retracted according to an example embodiment.
Figure 4:
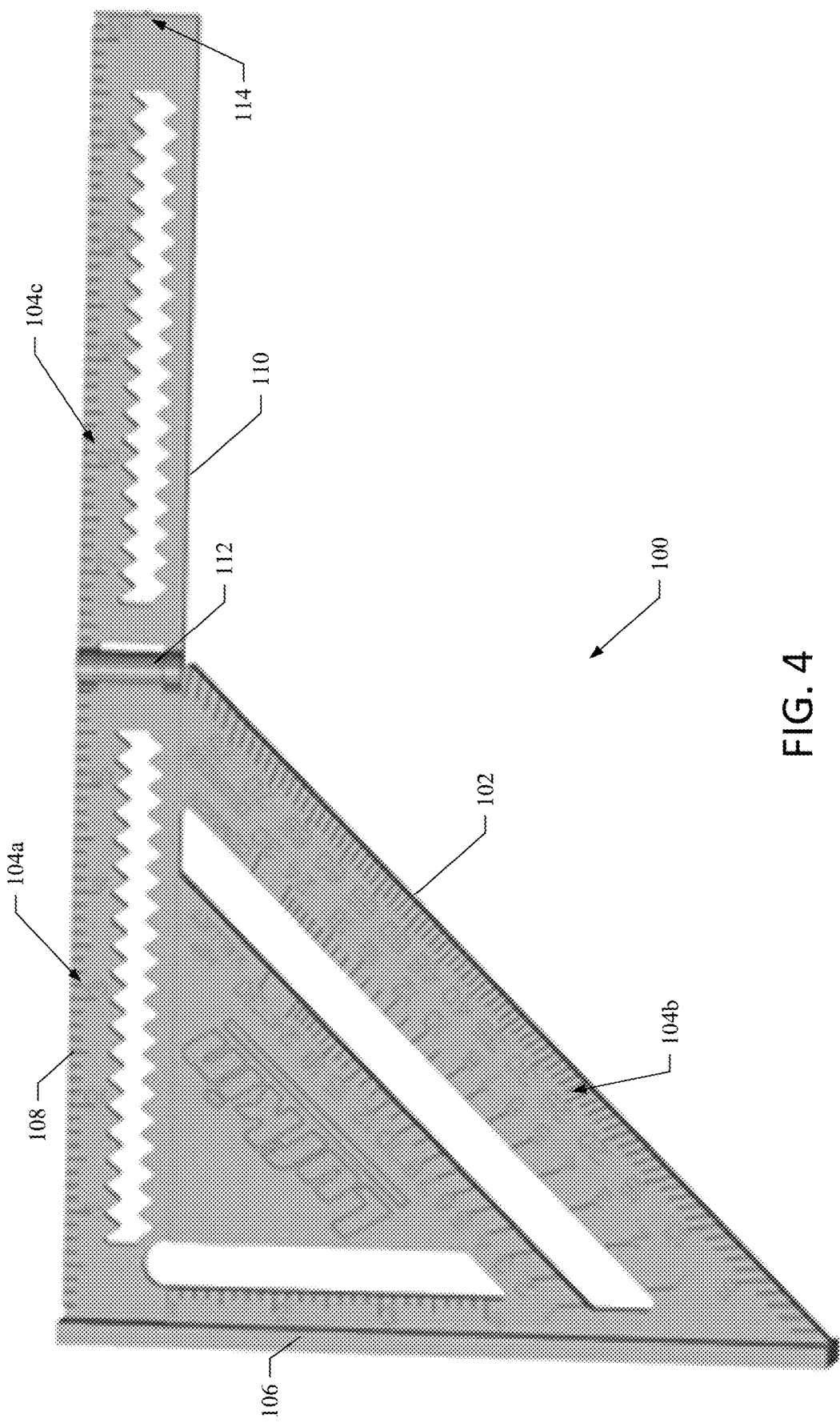
FIG. 4 illustrates a perspective view of a speed square with the extension element in the open position according to an example embodiment.

FIG. 3 illustrates a perspective view of the speed square 100 with the extension element 110 retracted according to an example embodiment. FIG. 4 illustrates a perspective view of a speed square with the extension element in the open position according to an example embodiment.

Figure 5:
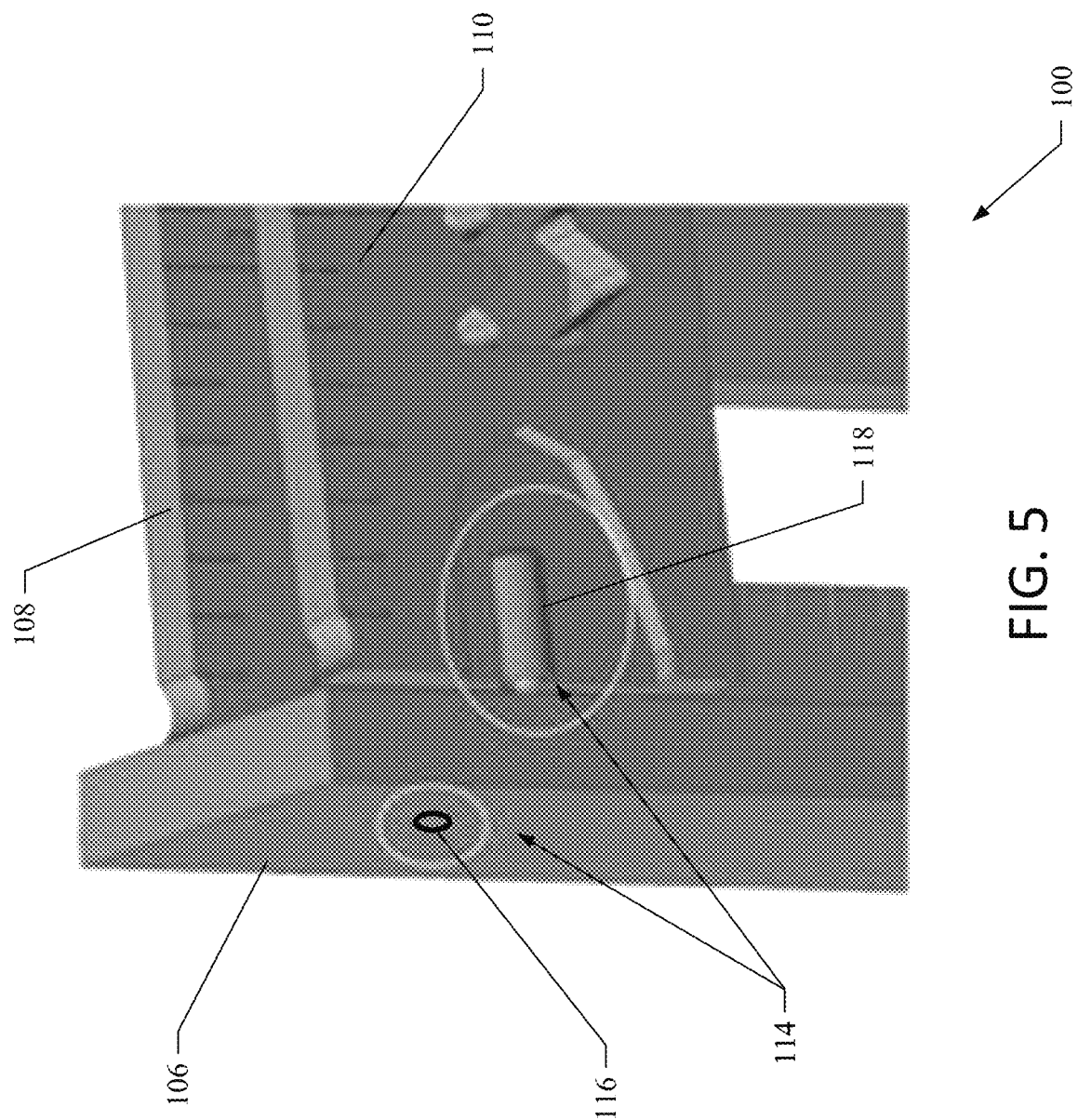
FIG. 5 illustrates a retention element according to an example embodiment.

FIG. 5 illustrates the retention element 114 according to an example embodiment. The extension element 110 depicted in FIG. 4 is in an intermediate position, e.g. partially open, near the stowed position. The retention element 114 may include an aperture 116 or depression in the T bar 106 or the extension element 110. The retention element 114 may also include a plunger 118 in the other of the T bar or extension element 110. The plunger 118 may be configured to be biased toward the aperture 116 or depression to maintain the extension element 110 in a stowed position, such as by a spring or other biasing element. A portion of the plunger 118 may extend into the aperture 116 when the extension element 110 is in the stowed position limiting or preventing the extension element 110 from extending. In some example embodiments, the speed square 100 may include a release, such as the lock release, discussed below in reference to FIG. 5. The release may be configured to actuate the plunger 118 to withdraw from the aperture 116 or depression. Alternatively, the release may be configured to eject the plunger 118 from the aperture 116, such as by pushing portion of the plunger 118 out of the aperture 116.

Figure 6:
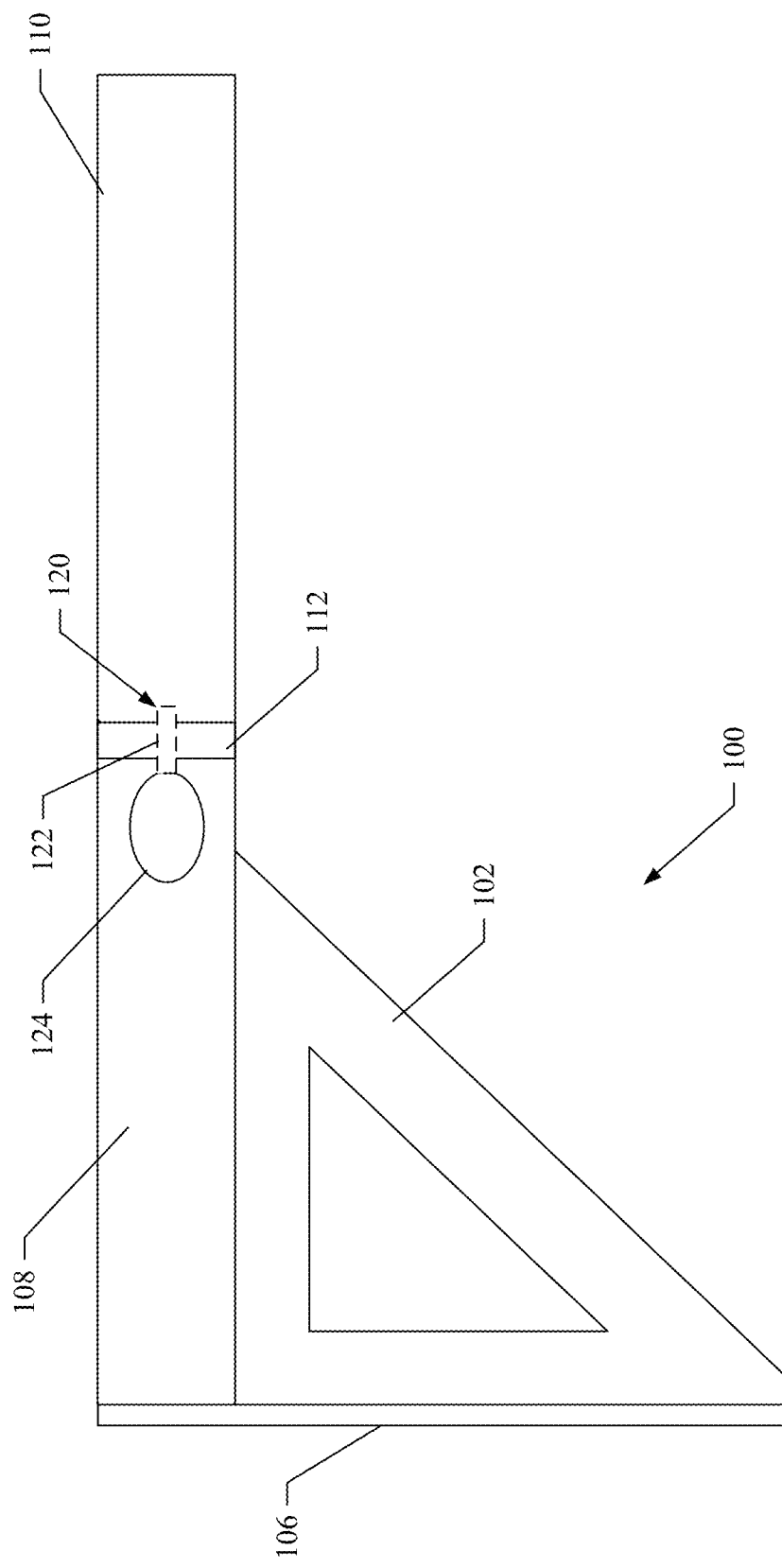
FIG. 6 illustrates an extension lock according to an example embodiment.

FIG. 6 illustrates an extension lock according to an example embodiment. The extension lock may be configured to retain the extension element 110 in the open position. The extension lock may include an aperture 120 or depression in the flat plate 102, the extension element 110, or the hinge 120. The extension lock may also include a plunger 122 in another of the flat plat 102, extension element 110, or hinge 112. The plunger 122 may be configured to be biased toward the aperture 120 or depression to maintain the extension element 110 in an open position, such as by a spring or other biasing element. A portion of the plunger 122 may extend into the aperture 120 or depression when the extension element 110 is in the open position limiting or preventing the extension element 110 from retracting. In some example embodiments, the speed square 100 may include a release 124. The release 124 may be configured to actuate the plunger 122 to withdraw from the aperture 120 or depression. Alternatively, the release 124 may be configured to eject the plunger 122 from the aperture 120 or depression, such as by pushing portion of the plunger 118 out of the aperture 116 or depression. In an example embodiment, the release 124 may be a thumb slide or button.

In some embodiments, the speed square may be further configured for optional modifications. In this regard, for example, the speed square may also include a retention element configured to retain the extension element in a stowed position. In an example embodiment, the retention element includes an aperture in the extension element or the T bar and a plunger on the other of the extension element and the T bar. The plunger is biased toward the aperture in the stowed position. In some example embodiments, the speed square also includes a hinge configured to extend and retract the extension element between an open position and a stowed position. In an example embodiment, a rotational axis of the hinge is parallel with a direction of extension of the T bar. In an example embodiment, the speed square also includes an extension lock configured to retain the extension element in an open position. In some example embodiments, the extension lock includes an aperture in the extension element or triangular flat plate and a plunger in the other of the extension element and the triangular flat plate. The plunger is biased toward the aperture in the open position. In an example embodiment, the extension lock comprises a lock release configured to release the extension lock to enable retraction of the extension element to a stowed position.

Many modifications and other embodiments of the tool set forth herein will come to mind to one skilled in the art to which these inventions pertain having the benefit of the teachings presented in the foregoing descriptions and the associated drawings. Therefore, it is to be understood that the power tools are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A speed square comprising:
    a triangular flat plate having measurement markings indicated on at least one face;
    a T bar affixed to, and extending along, a length of a first side of the triangular flat plate;
    an extension element operably coupled to a first end of a second side of the triangular flat plate opposite the T bar, the extension element having measurement markings indicated on at least one face of the extension element, such that the measurement markings of the at least one face of the triangular flat plat continue on the at least one face of the extension element; and
    a hinge configured to extend and retract the extension element between an open position and a stowed position, wherein the hinge couples a first end of the extension element to the first end of the second side of the triangular flat plate;
    wherein, in the stowed position, the extension element is disposed adjacent and parallel to a plane of a surface of the triangular flat plate; and
    wherein, in the open position, the extension element is disposed coplanar with the plane of the surface of the triangular flat plate.

2. The speed square of claim 1, wherein, in the stowed position;
    a second end of the extension element is disposed proximate to the T bar and an intersection of the first side of the triangular flat plate with the second side of the triangular flat plate, and
    the extension element is disposed external to the triangular flat plate; and wherein a rotational axis of the hinge is parallel with a direction of extension of the T bar.

3. The speed square of claim 1, wherein a rotational axis of the hinge is parallel with a direction of extension of the T bar.

4. The speed square of claim 1 further comprising: a retention element configured to retain the extension element in the stowed position, wherein the retention element is positioned proximate to the T bar when the extension element is in the stowed position.

5. The speed square of claim 4, wherein the retention element comprises a plunger configured to extend toward an aperture to retain the extension element in the stowed position responsive to alignment of the plunger and the aperture, wherein the plunger is biased toward the aperture in the stowed position; wherein the plunger is disposed in the extension element and the aperture is disposed in the T bar.

6. The speed square of claim 5, wherein the plunger is configured to urge a protruding element into the aperture, and wherein the plunger is oriented to urge the protruding element in a direction substantially parallel to a direction of longitudinal extension of the extension element.

7. The speed square of claim 4, wherein multiple instances of the retention element are provided on the extension element.

8. The speed square of claim 1, wherein an access window is disposed in the triangular flat plate proximate an intersection of the T bar and the second side, and wherein the extension element is visible through the access window in the stowed position and not visible through the access window in an open position.

9. The speed square of claim 8, wherein the extension element is configured to transition out of the stowed position responsive to force exerted on the extension element through the access window to overcome biasing of the retention element that is oriented to maintain the extension element in the stowed position.

10. The speed square of claim 1 further comprising:
    an extension lock configured to retain the extension element in the open position.

11. The speed square of claim 1, wherein the T bar extends substantially perpendicular to a plane in which the triangular flat plate lies away from both opposing faces of the triangular flat plate.

12. The speed square of claim 1, wherein the hinge connects the extension element to the triangular flat plate proximate to an intersection of the second side and a third side forming a hypotenuse of the triangular flat plate.

13. The speed square of claim 12, wherein the third side further comprises a set of angle measurement markings to enable measurement of an angle relative to the T bar.

14. The speed square of claim 1, wherein a rotational axis of the hinge is parallel with a direction of extension of the T bar;
    wherein during a transition between the stowed position and the open position, a line of the extension element extending from the first end to a second, opposite end of the extension element travels through a position where the line is orthogonal to the plane of the surface of the triangular flat plate.

15. A speed square comprising:
    a triangular flat plate having a first side, a second side, and a hypotenuse, the second side having first length measurement markings indicated thereon, and the hypotenuse having angle markings thereon;
    an extension element having second length measurement markings indicated thereon, such that the second length measurement markings continue from the first length measurement markings; and
    a hinge configured to extend and retract the extension element between an open position and a stowed position, wherein the hinge couples a first end of the extension element to an end of the second side of the triangular flat plate;
    wherein, in the stowed position, the extension element is disposed adjacent and parallel to a plane of a surface of the triangular flat plate; and
    wherein, in the open position, the extension element is disposed coplanar with the plane of the surface of the triangular flat plate.

16. The speed square of claim 15, wherein a rotational axis of the hinge is parallel with a direction of extension of the T bar.

17. The speed square of claim 15 further comprising:
    a retention element configured to retain the extension element in the stowed position, wherein the retention element is positioned proximate to the T bar when the extension element is in the stowed position.

18. The speed square of claim 17, wherein the retention element comprises a plunger configured to extend toward an aperture to retain the extension element in the stowed position responsive to alignment of the plunger and the aperture, wherein the plunger is biased toward the aperture in the stowed position.

19. The speed square of claim 17, wherein multiple instances of the retention element are provided on complementary surfaces of the first side and the extension element.

20. A speed square comprising:
- a triangular plate comprising a first triangular plate face and a second triangular plate face, the triangular plate further comprising triangular plate measurement markings, the first triangular plate face being opposite the second triangular plate face;
- a T bar affixed to, and extending along, a length of a first side of the triangular plate;
- an extension element operably coupled to a first end of a second side of the triangular plate opposite the T bar, the extension element comprising a first extension element face and a second extension element face, the first extension element face being opposite the second extension element face, wherein the first extension element face or the second extension element face comprise extension element measurement markings, wherein the triangular plate measurement markings on the triangular plate continue with the extension element markings on the extension element; and
- a hinge configured to extend and retract the extension element between an open position and a stowed position, wherein the hinge couples a first end of the extension element to the first end of the second side of the triangular plate;

wherein, in the stowed position, the first extension element face is parallel to a plane of the first triangular plate face; and wherein, in the open position, the first extension element face is coplanar with a plane of the second triangular plate face.

* * * * *